(No Model.)

J. T. CASSINO.
SPOON HOLDER.

No. 596,982. Patented Jan. 11, 1898.

Witnesses
W. C. Lunsford
Chas. E. Brock

Inventor
J. T. Cassino,
by Munn & Co.
Attorneys

UNITED STATES PATENT OFFICE.

JOHN T. CASSINO, OF PEABODY, MASSACHUSETTS.

SPOON-HOLDER.

SPECIFICATION forming part of Letters Patent No. 596,982, dated January 11, 1898.

Application filed June 21, 1897. Serial No. 641,613. (No model.)

*To all whom it may concern:*

Be it known that I, JOHN T. CASSINO, residing at Peabody, in the county of Essex and State of Massachusetts, have invented a new and useful Spoon-Holder, of which the following is a specification.

My invention is in the nature of a spoon-holder to be attached to the side of a bowl, dish, pan, or like kitchen utensil to prevent the spoon from sliding into the utensil.

The object of my invention is to obviate the difficulty heretofore experienced by housewives and others who have occasion to use spoons in dishes and like utensils in preventing the spoon from sliding sidewise and dropping into the contents of the utensil.

With this object in view my invention consists in the improved construction and arrangements of parts hereinafter fully described, and afterward specifically pointed out in the claim.

In order to enable others skilled in the art to which my invention most nearly appertains to make and use the same, I will now proceed to describe its construction and operation, having reference to the accompanying drawings, forming part of this specification, in which—

Figure 1:
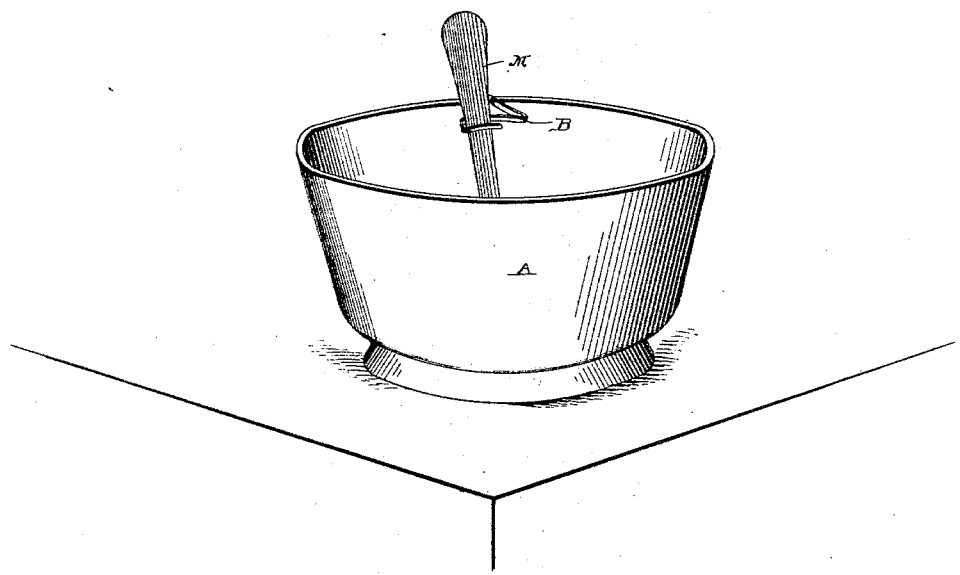
Figure 2:
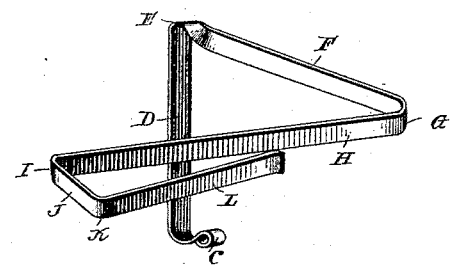
Figure 3:
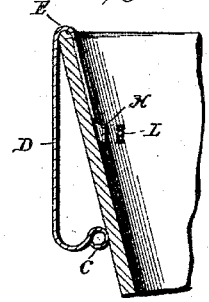

Figure 1 is a perspective view of a bowl having a spoon-holder constructed in accordance with my invention attached thereto and a spoon in position. Fig. 2 is a perspective view of the holder detached from the bowl. Fig. 3 is a fragmentary detail view, being a sectional view of one side of the bowl with the spoon-holder attached.

Like letters of reference mark the same parts wherever they occur in the different figures of the drawings.

Referring to the drawings by letter, A is a bowl, or it may be any other utensil in which a spoon is to be used.

B is my improved spoon-holder.

My spoon-holder is preferably constructed of a single piece, strip, or ribbon of tempered steel, although any other equivalent elastic material might be used. The strip is bent into the form of a loop C at its lower end to provide a rounded bearing to rest against the outside of the bowl. From this point it is bent outward and backward at D until the top of the bowl is reached, as at E, where it is twisted to bring the flat side of the ribbon into a vertical plane and carried inward, forming an arm F, extending into the bowl and laterally along its inside. The strip is again bent at G, forming an arm H, which also lies parallel to the inner side of the bowl and lies thereupon. At the point I the strip is again bent inwardly, forming an arm J, which projects toward the center of the bowl a slight distance. At the point K the strip is again bent, forming an arm L within and substantially parallel to the arm H.

In using my invention the loop C is passed down along the outer side of the bowl, which brings the arm F upon its inside and in contact therewith and also causes the point I to rest upon the inside of the bowl. It will be held securely in this position, and after using the spoon M it may be placed in the seat formed between the arms H and L, where it will rest securely in a vertical position, with no liability whatever to drop or slide laterally into the contents of the bowl.

By the use of this invention the inconvenience attending the fishing of the spoon out of the bottom of a bowl or other utensil containing, perhaps, hot contents is entirely obviated and a cheap, simple, durable, and effective device is provided which can be instantly applied to or removed from the bowl or other utensil whenever desired.

While I have illustrated and described the best means now known to me for carrying out my invention, I wish it to be understood that I do not restrict myself to the exact forms and arrangements shown, but hold that any slight change or variation therein, such as might suggest itself to the ordinary mechanic, would properly fall within the limit and scope of my invention.

Having thus described my invention, what I claim as new, and desire to secure by Letters Patent of the United States, is—

The spoon-holder herein described consisting of a single strip or ribbon of elastic sheet metal bent to form as follows, that is to say having a rounded bearing C, a vertical arm D, a bend at E at the top of said arm whereby the strip is turned at right angles to the arm D, an arm F, an arm H adapted to lie in a substantially horizontal position, a short inward-projecting arm J, and an arm L substantially parallel with the arm H, all as set forth.

JOHN T. CASSINO.

Witnesses:
A. F. WHIDDEN,
A. F. BLAKE.